United States Patent
Becker

(10) Patent No.: US 6,947,356 B1
(45) Date of Patent: Sep. 20, 2005

(54) METHOD FOR SELECTING A STORAGE MEDIUM

(75) Inventor: Volker Becker, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,066

(22) PCT Filed: Apr. 14, 2000

(86) PCT No.: PCT/DE00/01166

§ 371 (c)(1),
(2), (4) Date: Apr. 18, 2002

(87) PCT Pub. No.: WO00/65593

PCT Pub. Date: Nov. 2, 2000

(30) Foreign Application Priority Data

Apr. 27, 1999 (DE) ................................ 199 19 032

(51) Int. Cl.[7] .............................................. G11B 17/22
(52) U.S. Cl. ............................ 369/30.29; 369/30.06; 360/98.04
(58) Field of Search .................... 369/30.29, 30.06, 369/30.28, 30.27, 30.35, 47.1; 360/98.01, 360/98.04, 98.05, 53, 73.03

(56) References Cited

U.S. PATENT DOCUMENTS

| | | | |
|---|---|---|---|
| 4,314,366 A | 2/1982 | Galia | 369/35.01 |
| 4,538,253 A | 8/1985 | Ishibashi et al. | 369/30.3 |
| 5,185,727 A * | 2/1993 | Blakeway et al. | 369/30.29 |
| 6,115,332 A | 9/2000 | Asakura et al. | 369/30.35 |
| 6,212,138 B1 * | 4/2001 | Kalis et al. | 369/30.06 |

FOREIGN PATENT DOCUMENTS

| | | |
|---|---|---|
| DE | 196 51 411 | 6/1998 |
| EP | 0 342 002 | 11/1989 |
| GB | 2 030 754 | 4/1980 |
| JP | 10 340516 | 12/1998 |

OTHER PUBLICATIONS

Blaupunkt catalog "Sound und Fahvergnugen pur. Mobile Kommunikation von Blaupunkt. Programm 96/97. " [Pure Sound and Driving Pleasure. Mobile Communication from Blaupunkt Program 96/97].
Patent Abstract of Japan, vol. 1999, No. 3, Mar. 13, 1999.

* cited by examiner

Primary Examiner—Ali Neyzari
(74) Attorney, Agent, or Firm—Kenyon & Kenyon

(57) ABSTRACT

A method for providing user-friendly selection of a storage medium, in particular an optical storage disk, from a plurality of storage mediums. The storage mediums are assigned to a playback device, in particular a compact disk changer, for reading out and reproducing stored data and can be stored in a storage apparatus, arrangement or structure, in which a playback probability is determined for each storage medium, and in which the storage medium having the lowest playback probability is then released to be ejected from the playback device or from the storage apparatus, arrangement or structure.

14 Claims, 2 Drawing Sheets

METHOD FOR SELECTING A STORAGE MEDIUM

FIELD OF THE INVENTION

The present invention relates to a method for selecting a storage medium, in particular an optical storage disk, from a plurality of storage mediums, which are assigned to a playback device, in particular a compact disk changer, for reading out and reproducing stored data, and which can be stored in a storage apparatus, arrangement or structure.

BACKGROUND INFORMATION

Compact disk changer CDC-F 05, for example, where up to ten different compact disks are assigned to a playback device for reading out and reproducing stored data and can be stored in a magazine is discussed in the Blaupunkt catalog "Sound und Fahrvergnügen pur. Mobile Kommunikation von Blaupunkt. Programm 96/97." [Pure Sound and Driving Pleasure. Mobile Communication from Blaupunkt. Program 96/97]. In this context, a compact disk to be played back in the assigned playback device, for example, can be selected.

SUMMARY OF THE INVENTION

In contrast, the exemplary method and/or exemplary embodiment according to the present invention is believed to have the advantage that a playback probability is determined for each storage medium, and that the storage medium having the lowest playback probability is released to be ejected from the playback device or from the storage apparatus, arrangement or structure. In this manner, the decision regarding the ejection of a no longer needed storage medium is automated. This should eliminate or at least reduce the effort for a user to inform himself as to the storage mediums located in the storage apparatus, arrangement or structure, to then select a no longer necessary storage medium, and to be able to release it for ejection. Thus, the user may be spared from obtaining an overview of the storage mediums stored in the storage apparatus, arrangement or structure and selecting the no longer needed storage medium for ejection, e.g. by way of naming the storage mediums in the storage apparatus, arrangement or structure, initiating the play of individual storage mediums or even removing individual storage mediums by way of trial and subsequently examining a label on the individual storage mediums. Thus, the handling time for ejecting a no longer needed storage medium may be significantly reduced.

In this context, it may be particularly advantageous that an ejection prompt is generated when the supply apparatus, arrangement or structure for storing the storage mediums is full, or when it is detected, which may be by proximity sensors, that an additional storage medium is to be inserted into the playback device or into the storage apparatus, arrangement or structure. In this manner, the user's handling time is solely limited to his specific intention of inserting a new storage medium. In the case of an already completely filled storage apparatus, arrangement or structure, the user may no longer need to select a no longer needed storage medium for ejection prior to an additional storage medium being inserted.

An additional advantage may be that the playback probability is determined as a function of the time that was assigned for the storage medium in question to the playback device for reading out and reproducing stored data, and that the longer this time was, the lower the playback probability for this storage medium is determined to be. In this manner, the storage medium first inserted into the storage apparatus, arrangement or structure or the playback device may also be the first to be ejected. Thus, the storage medium that has been in the storage apparatus, arrangement or structure or in the playback device the longest can be the first to be ejected.

A further advantage is that the playback probability may be determined as a function of the frequency with which the stored data of the storage medium in question is read out and reproduced by the playback device, and that the greater this frequency is, the greater (higher) the playback probability for this storage medium is determined to be. In this manner, a preferred storage medium having the greatest playback frequency can be spared the ejection operation.

An additional advantage is that, when determining frequency, less current read-out operations and reproduction operations are given a lesser valuation. In this manner, the historic development of the playback frequency of all of the storage mediums in the playback device can be taken into consideration. As a result, trends in the playback frequency can be recognized and drawn upon as ejection criteria. This can also result in a preferred storage medium being released for ejection at some instant without its playback frequency having to be exceeded by other storage mediums, namely when the preference for the storage medium in question is no longer current.

A further advantage is that in response to the storage medium released for ejection for a predefined time not being removed or such a storage medium being reinserted, a storage medium differing from this storage medium and having the next greater (next one up, or next lowest) playback probability is released for ejection. In this manner, the wish of the user to continue to store the storage medium released for ejection in the playback device or in the storage apparatus, arrangement or structure can be taken into consideration, so that the selection of the storage mediums to be ejected is adapted to the needs of the user.

An additional advantage is that the non-removal of a storage medium released for ejection for a predefined time or the reinsertion of such a storage medium is stored, that the playback probability for this storage medium is determined as a function of this stored non-removal or of the stored reinsertion, and that the playback probability for this storage medium in the case of non-removal or reinsertion is determined to be greater. In this manner, the wish of the user to continue to store a storage medium proposed for ejection in the playback device or in the storage apparatus, arrangement or structure is also taken into account for future selection operations in that the playback probability for the corresponding storage medium is accordingly adapted to the user's actions.

A further advantage is that selection operations for ejecting storage mediums initiated at an operator device are stored, and that playback probabilities for the storage mediums may be determined as a function of the stored selection operations. In this manner, the user's strategy can be observed, the playback device being capable of learning from the user's individual selection actions and of emulating them when selecting the storage medium to be provided for ejection. In this manner, the exemplary method for selecting a storage medium is increasingly adapted to the user's needs over time and thereby optimized.

DETAILED DESCRIPTION

Figure 1:
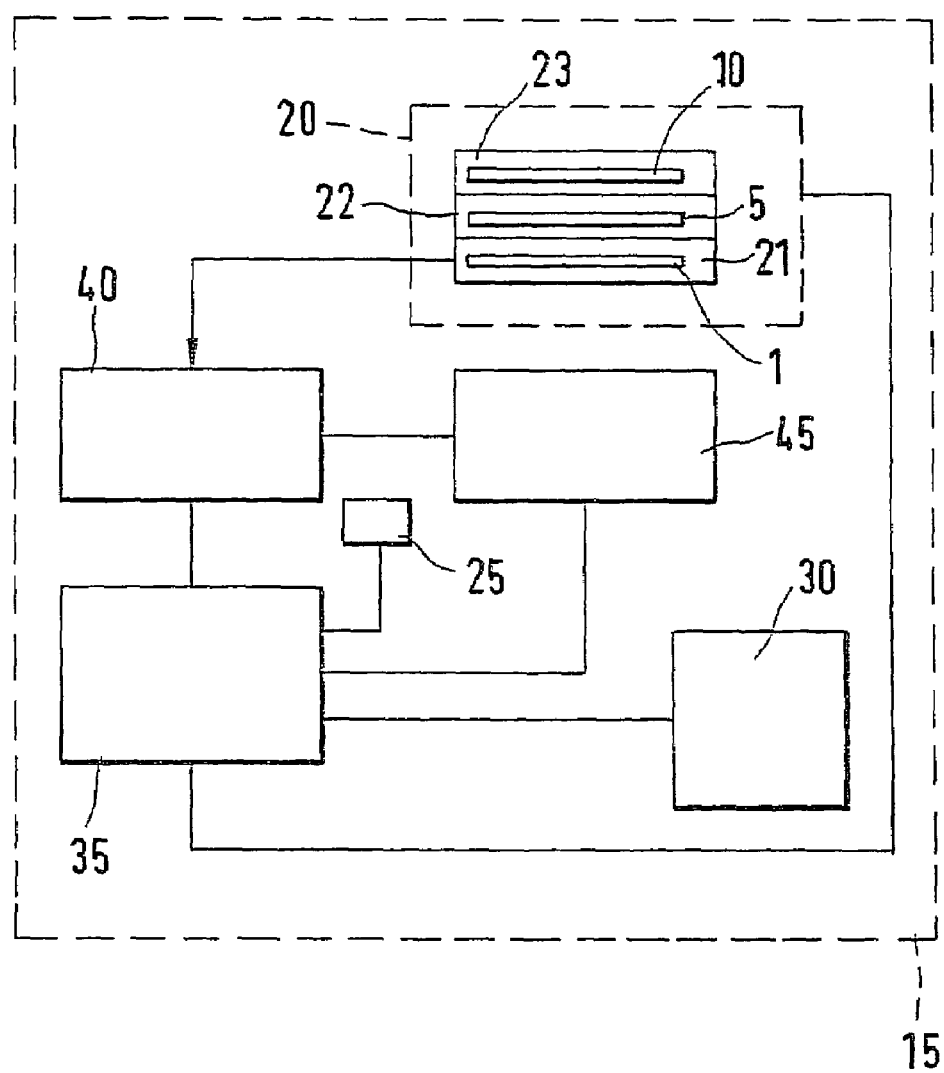
FIG. 1 shows a block diagram of a playback device.

In FIG. 1 is shown a playback device 15, which can be configured as a compact disk changer, for example. Playback device 15 includes a storage apparatus, arrangement or structure 20, which can be configured as a magazine of a compact disk changer, for example. Storage apparatus, arrangement or structure 20 includes a first storage space 21, a second storage space 22, and a third storage space 23. A first storage medium 1 is stored in first storage space 21. A second storage medium 5 is stored in second storage space 22. A third storage medium 10 is stored in third storage space 23. Storage mediums 1, 5, 10 can, for example, be configured as optical storage disks, i.e., as compact disks or as CD-ROMs or as digital video disks or DVDs. However, storage mediums 1, 5, 10 can also be magnetic storage disks, playback device 15 being then configured as a playback device for magnetic storage disks.

Storage apparatus, arrangement or structure 20 is connected at one end to a playback unit 40 for playing back a storage medium and at the other end to a controller 35. In addition, a proximity sensor 25, a memory unit 45, and an operator device 30 are connected to controller 35. Playback unit 40 is likewise connected to controller 35 as well as to memory unit 45. Proximity sensor 25 is situated in the vicinity of an input slot (not shown in FIG. 1) of playback device 15 or of storage apparatus, arrangement or structure 20. Playback unit 40 can be assigned to each of the three storage spaces 21, 22, 23. FIG. 1 shows first storage space 21 assigned to playback unit 40.

Via operator device 30, a user of playback device 15 can select one of storage mediums 1, 5, 10 for the data stored on the storage medium to be read out and reproduced via playback unit 40. In this context, first storage medium 1 in first storage space 21, for example, is to have been selected by the user. First storage medium 1 is then transported from first storage space 21 of storage apparatus, arrangement or structure 20 to playback unit 40 and deposited there, so that it can be read out by a read device (not shown in FIG. 1) of playback unit 40 and reproduced by a reproduction device (likewise not shown in FIG. 1).

The reproduction device can be an optical display device and/or at least one loudspeaker, depending on whether audio data and/or video data are being read from first storage medium 1. It can be provided that the frequency with which storage mediums 1, 5, 10 are selected for reading out and reproducing the stored data is stored in memory unit 45.

Additionally or alternatively, the sequence in which storage mediums 1, 4, 10 are inserted into playback device 15 or into storage apparatus, arrangement or structure 20 can be stored in memory unit 45. It can also be provided that, using the operator device, the user can select a storage medium in a storage space of storage apparatus, arrangement or structure 20 to be ejected from playback device 15 or from storage apparatus, arrangement or structure 20 via the input slot not shown in FIG. 1.

For such a selection, the user can, for example, use a naming of storage mediums 1, 5, 10 in storage apparatus, arrangement or structure 20, previously carried out via operator device 30, to orientate himself, as long as a display device (not shown in FIG. 1) connected to controller 35 is provided on which each of the names of storage mediums 1, 5, 10 can be represented. The user can also make a selection in that the individual storage mediums 1, 5, 10 are supplied one after another to playback unit 40 to initiate play, i.e., to be partially read out and reproduced, so that the user can select the storage medium to be ejected based on the at least partial reproduction of the data stored on each storage medium 1, 5, 10.

Furthermore, the selection could be carried out via an ejection operating element (not shown in FIG. 1) of operator device 30, activating the ejection operating element resulting in storage mediums 1, 5, 10 being able to be ejected in succession from playback device 15 or from storage apparatus, arrangement or structure 20, so that the user can make a selection based on the label of the storage medium in question and can reinsert the storage mediums not selected into playback device 15 or into storage apparatus, arrangement or structure 20, which, together with playback unit 40, e.g. a compact disk changer, can also be situated outside of playback device 15.

In this context, it can be provided that the selection operations initiated by the user at operator device 30 for ejecting storage mediums 1, 5, 10 are registered and are stored in memory unit 45 as a result of controller 35, so that the selection operations carried out by the user for ejecting storage mediums 1, 5, 10 are stored in memory unit 45.

Playback device 15 has a function via which a storage medium 1, 5, 10 stored in storage apparatus, arrangement or structure 20 or in playback unit 40 is automatically selected to be ejected, i.e., without the user making a selection. For this purpose, a playback probability is determined for each storage medium 1, 5, 10. The storage medium having the lowest playback probability is then released to be ejected from playback device 15 or from storage apparatus, arrangement or structure 20.

In this context, according to FIG. 1, first storage medium 1 should have the lowest playback probability and be released for ejection from playback device 15 or from storage apparatus, arrangement or structure 20, as is indicated by the corresponding arrow in FIG. 1. In this context, first storage medium 1 can be released in the event that there is an ejection prompt. The existence of an ejection prompt can also be a prerequisite for controller 35 to calculate the playback probabilities of the individual storage mediums 1, 5, 10.

In the present exemplary embodiment, two different possibilities for producing such an ejection prompt are described. In this context, a suitable ejection prompt can be generated by operating, e.g. for a predefined minimum duration, the ejection operating element (not shown in FIG. 1) of operator device 30 in a characteristic manner, or by operating an additional ejection operating element, e.g. in the form of a button, of operator device 30. In the case of a storage apparatus, arrangement or structure 20 offset from playback device 15, a corresponding ejection operating element can also be provided at storage apparatus, arrangement or structure 20.

The generation of the ejection prompt can also be carried out or performed by proximity sensor 25, for example. In the case that proximity sensor 25 detects in the vicinity of the input slot at playback device 15 or at storage apparatus, arrangement or structure 20 that an additional storage medium is to be inserted into playback device 15 or into storage apparatus, arrangement or structure 20, in that the additional storage medium in brought into the vicinity of the corresponding input slot and, as such, into the range of effect of proximity sensor 25, the ejection prompt is automatically generated, provided that storage apparatus, arrangement or structure 20 for storing storage mediums 1, 5, 10 is full.

In this context, storage apparatus, arrangement or structure 20 is detected as full when the number of storage mediums 1, 5, 10 in playback device 15 corresponds with the number of storage spaces 21, 22, 23 of storage apparatus, arrangement or structure 20, at least one storage space 21, 22, 23 also being able to be empty, and the corresponding storage medium being in playback unit 40 to be read out and reproduced, for example. In this context, storage apparatus, arrangement or structure 20 can have more or less than three storage spaces 21, 22, 23.

Different criteria can be provided individually or in combination for determining the playback probability of the individual storage mediums 1, 5, 10. In this context, the playback probability can be determined as a function of the time that was assigned for the respective storage medium 1, 5, 10 to playback device 15 for reading out and reproducing stored data. This is then possible when the sequence in which storage mediums 1, 5, 10 were inserted into playback device 15 or into storage apparatus, arrangement or structure 20 is stored in memory unit 45.

In this context, the storage medium inserted first has been assigned to playback device 15 the longest. In this context, the playback probability for the individual storage mediums 1, 5, 10 is determined by controller 35, and the longer the time, i.e., the earlier the corresponding storage medium 1, 5, 10 was inserted into playback device 15 or into storage apparatus, arrangement or structure 20, the lower the playback probability.

Additionally or alternatively, the playback probability can be determined as a function of the frequency with which the stored data of each storage medium 1, 5, 10 are read out and reproduced by playback device 15. Prerequisite for this is that the corresponding frequency or playback instant is also stored in memory unit 45. In this context, the greater this frequency is, the greater the playback probability determined in controller 35 is for the particular storage medium 1, 5, 10.

In this context, less current read-out operations and reproduction operations can also be given a lesser valuation for determining the frequency. In this manner, the historic development of the playback frequency of all of storage mediums 1, 5, 10 located in playback device 15 are taken into consideration, provided that the corresponding playback instant of these storage mediums 1, 5, 10 are stored in memory unit 45, which, for this purpose, may be configured as a non-volatile memory. Therefore, trends in the playback frequency can be detected by controller 35 and drawn upon as ejection criteria.

Additionally or alternatively to the described criteria for determining the playback probability, it can also be provided that, in the case that the user's selection operations initiated at operator device 30, for ejecting storage mediums 1, 5, 10 are also stored in memory unit 45, the playback probabilities for storage mediums 1, 5, 10 may be determined as a function of these stored selection operations. Consequently, controller 35 can observe the user's strategy for selecting storage mediums to be ejected and learn from the user's individual selection actions, so that the selection carried out by controller 35 is increasingly adapted to the user's needs over time and, thus, optimized.

Given the existence of an ejection prompt, the storage medium 1, 5, 10 having the lowest playback probability is released by controller 35 for ejection. In this context, the release may be carried out for a predefined time. According to FIG. 1, first storage medium 1, for example, should have the lowest playback probability and, thus, be released. If first storage medium 1 is not removed after the predefined time or is reinserted into playback device 15 or into storage apparatus, arrangement or structure 20, controller 35 recognizes that the user does not accept its selection and releases for ejection a storage medium 5, 10 other than storage medium 1, having the next greatest (next one up, or next lowest) playback probability.

In this context, the exemplary method and/or exemplary embodiment may provide for the non-removal of a storage medium 1, 5, 10 released to be ejected for a predefined time or the reinsertion of such a storage medium 1, 5, 10 is stored in memory unit 45, and that controller 35 determines the playback probability for this storage medium 1, 5, 10 as a function of the stored non-removal or the stored reinsertion, the playback probability for this storage medium 1, 5, 10 being greater in the case of a stored non-removal or reinsertion.

In this context, the number of non-removals or reinsertions of the corresponding storage medium 1, 5, 10 can also be stored in memory unit 45, controller 35 determining the playback probability to be greater for the corresponding storage medium 1, 5, 10 when a greater number of non-removals or reinsertions has been stored.

Also in this manner, controller 35 adapts its selection method to the needs of the user, in that it takes the user's rejection of its selection proposals into account when determining the playback probability for storage mediums 1, 5, 10.

Analogously to the criteria for the frequency for reading out and reproducing a storage medium 1, 5, 10, it can further be provided that less current non-removals and reinsertions are given a lesser valuation when determining playback frequency. For this purpose, the historic development of the non-removals or reinsertions of all of the storage mediums 1, 5, 10 located in playback device 15 or in storage apparatus, arrangement or structure 20 must be accordingly stored in memory unit 45, so that in this manner trends in the non-removal or reinsertion of storage mediums 1, 5, 10 can be likewise detected and drawn upon as ejection criteria.

In the event that controller 35 determines the lowest playback probability for more than one storage medium, i.e., the same lowest playback probability for the storage mediums, controller 35 randomly selects one of these storage mediums for ejection.

Figure 2:
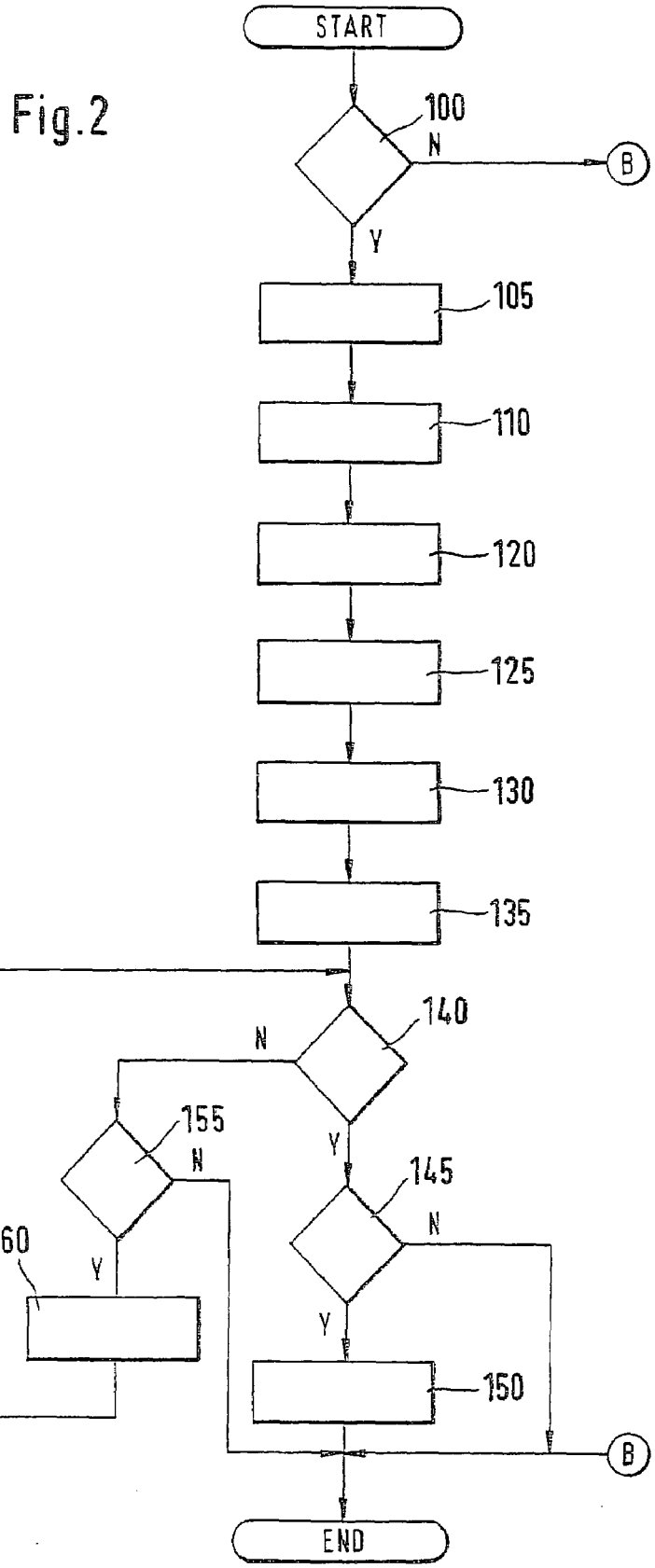
FIG. 2 shows a flow diagram for carrying out the exemplary method and/or for use in an exemplary embodiment according to the present invention, for selecting a storage medium.

FIG. 2 shows a flow diagram for the functioning method of controller 35, consideration, for example, of all indicated criteria for determining the playback probability being provided. At a program point 100, controller 35 checks whether there is an ejection prompt. If this is the case, the program branches to program point 105, otherwise the program is exited. At program point 105, controller 35 determines from memory unit 45 the times that were assigned for each storage medium 1, 5, 10 to playback device 15 for reading out and reproducing stored data.

Subsequently, the program branches to a program point 110. At program point 110, controller 35 determines from memory unit 45 the frequency with which the stored data of each storage medium 1, 5, 10 are read out or reproduced by playback device 15. In this context, the controller also takes from memory unit 45 the instants of the read-out operations and reproduction operations necessary for determining frequency. In this context, less current read-out operations and reproduction operations are given a lesser valuation by controller 35 when calculating the frequency for the individual storage mediums 1, 5, 10.

Subsequently, the program branches to a program point 120. At program point 120, controller 35 determines from memory unit 45 the selection operations initiated at operator device 30 for ejecting the individual storage mediums 1, 5, 10. In the event that the instants of the selection operations for ejecting the individual storage mediums 1, 5, 10, initiated at operator device 30 by the user are also stored in memory unit 45, these instants can be taken into consideration in addition to the valuation of the selection operations determined by controller 35, less current selection operations being given a lesser valuation. The program subsequently branches to a program point 125.

At program point 125, controller 35 determines from memory unit 45 the non-removals of storage mediums 1, 5, 10 released for ejection for a predefined time or the reinsertions of such storage mediums 1, 5, 10. If the instants of the non-removals or reinsertions are also stored in memory unit 45, the non-removals or reinsertions determined by controller 35 can additionally be evaluated as a function of the determined instants, less current non-removals or reinsertions being given a lesser valuation. Subsequently, the program branches to a program point 130.

At program point 130, controller 35 determines, as a function of the previously determined criteria, the playback probability for the individual storage mediums 1, 5, 10 in the previously described manner. Subsequently, the program branches to a program point 135. At program point 135, controller 35 releases the storage medium having the lowest playback probability for a predefined time. Subsequently, the program branches to a program point 140.

At program point 140, controller 35 checks whether the released storage medium was removed by the user within the predefined time or not reinserted. If this is the case, the program branches to program point 145, otherwise the program branches to program point 155. At program point 145, controller 35 checks whether an additional storage medium to be inserted into playback device 15 or storage apparatus, arrangement or structure 20 was detected by proximity sensor 25 or in another manner. If this is the case, the program branches to program point 150, otherwise the program is exited.

At program point 150, controller 35 causes the additional storage medium inserted into the input slot of playback device 15 or of storage apparatus, arrangement or structure 20 to be drawn in. The program is subsequently exited. At program point 155, controller 35 checks whether there is a storage medium having a greater playback probability in storage apparatus, arrangement or structure 20 or in playback device 15. If this is the case, the program branches to program point 160, otherwise the program is exited.

At program point 160, controller 35 releases the storage medium having the next greatest (next one up, or next lowest) playback probability to be ejected for the predefined time. The program subsequently branches back to program point 140.

The trend for playback devices 15 configured as compact disk changers is for increasingly smaller designs. Compact disk changers are playback devices 15 for storage mediums configured as compact disks, where the compact disk to be played is automatically transported from storage apparatus, arrangement or structure 20 to playback unit 40 and played there.

Due to demands of the automobile manufacturers, playback devices 15, which fit in a so-called 1-DIN housing, are currently being developed for mobile applications in motor vehicles. This particularly small type of construction results in constructions where the compact disks are directly inserted into playback device 15 via an input slot and transported from there into the appropriate storage space 21, 22, 23 of storage apparatus, arrangement or structure 20. As a result of the exemplary method and/or exemplary embodiment according to the present invention, the user must no longer select a no longer needed compact disk for ejection prior to inserting an additional compact disk in the case of an already completely filled storage apparatus, arrangement or structure 20, but a disk is automatically released by controller 35 for ejection as a function of its playback probability.

What is claimed is:

1. A method for selecting a storage medium from a plurality of storage mediums assigned to a playback device for reading out and reproducing stored data, and which is storable in a storage arrangement, the method comprising:

determining a playback probability as a function of a time assigned to the playback device for a respective storage medium for reading out and reproducing stored data, wherein the time is longer for a determined lower playback probability for the respective storage medium; and releasing one storage medium of the plurality of storage mediums having a lowest playback probability for ejection from one of the playback device and from the storage arrangement.

2. The method of claim 1, wherein in the step of releasing, the one storage medium is released if there is an ejection prompt.

3. The method of claim 2, wherein an ejection prompt is provided when a supply arrangement for storing the plurality of storage mediums is full, and an additional storage medium is to be inserted into one of the playback device and the storage arrangement when the ejection prompt is detected.

4. The method of claim 2, wherein the ejection prompt is provided when a suitable operating function is activated at the one of the playback device and the storage arrangement.

5. The method of claim 1, wherein the playback probability is determined as a function of a frequency with which stored data of the one storage medium is read out and reproduced by the playback device, and the playback probability for the one storage medium is determined to be greater for a greater frequency.

6. The method of claim 5, wherein less current read-out operations and reproduction operations are given a lesser valuation when determining the frequency.

7. The method of claim 1, further comprising:

releasing for ejection another storage medium of the plurality of storage mediums differing from the one storage medium and having a next lowest playback probability, in response to one of the one storage medium being released for ejection for a predefined time of not being removed and the one storage medium being reinserted.

8. The method of claim 1, further comprising storing one of a non-removal of the one storage medium released for ejection for a predefined time and reinsertion of the one storage medium wherein:

the playback probability for the one storage medium is determinable as a function of one of a stored non-removal and a stored reinsertion; and the playback probability for the one storage medium is determined to be greater for one of the non-removal and the reinsertion.

9. The method of claim 1, wherein at least one selection operation for ejecting the one storage medium initiated at an operator device is stored, and playback probabilities for the plurality of storage mediums are determinable as a function of at least one stored selection operation.

10. The method of claim 1, wherein the storage medium includes an optical storage disk.

11. The method of claim 1, wherein the playback device includes a compact disk changer.

12. The method of claim 1, wherein the storage medium includes an optical storage disk, and the playback device includes a compact disk changer.

13. The method of claim 3, wherein the ejection prompt is detected by a proximity sensor.

14. The method of claim 4, wherein the suitable operating function is activated by manipulating a button.

* * * * *